United States Patent
Siebke et al.

(10) Patent No.: US 9,874,242 B2
(45) Date of Patent: Jan. 23, 2018

(54) BEARING ARRANGEMENT COMPRISING A BACKUP BEARING

(71) Applicant: Schaeffler Technologies AG & Co. KG, Herzogenaurach (DE)

(72) Inventors: Peter Siebke, Herzogenaurach (DE); Stefan Ruhl, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/894,720

(22) PCT Filed: Apr. 25, 2014

(86) PCT No.: PCT/DE2014/200184
§ 371 (c)(1),
(2) Date: Nov. 30, 2015

(87) PCT Pub. No.: WO2014/194900
PCT Pub. Date: Dec. 11, 2014

(65) Prior Publication Data
US 2016/0123389 A1 May 5, 2016

(30) Foreign Application Priority Data
Jun. 3, 2013 (DE) .................. 10 2013 210 218

(51) Int. Cl.
F16C 32/04 (2006.01)
F16C 39/02 (2006.01)
F16C 23/08 (2006.01)

(52) U.S. Cl.
CPC .......... *F16C 32/0442* (2013.01); *F16C 23/08* (2013.01); *F16C 39/02* (2013.01)

(58) Field of Classification Search
CPC ...... F16C 39/00; F16C 39/02; F16C 32/0442; F16C 23/082; F16C 23/084; F16C 27/04; F16C 27/06
See application file for complete search history.

(56) References Cited

U.S. PATENT DOCUMENTS

| | | | | |
|---|---|---|---|---|
| 3,294,458 A | * | 12/1966 | Mishima | F16C 27/04 384/536 |
| 3,306,679 A | * | 2/1967 | Stokely | F16C 27/066 384/536 |
| 4,025,135 A | * | 5/1977 | Hishida | F16C 13/006 384/498 |
| 4,129,343 A | | 12/1978 | Janssen | |
| 4,496,252 A | * | 1/1985 | Horler | C23C 16/45504 384/215 |
| 4,668,110 A | * | 5/1987 | Egeto | B65G 39/09 193/37 |

(Continued)

FOREIGN PATENT DOCUMENTS

| | | | |
|---|---|---|---|
| DE | 2747427 | 4/1978 | |
| DE | 19543114 A1 | * 5/1997 | ............. F16C 27/04 |

(Continued)

*Primary Examiner* — Alan B Waits
(74) *Attorney, Agent, or Firm* — Volpe and Koenig, P.C.

(57) ABSTRACT

The invention relates to a bearing arrangement including a backup bearing (2), which is provided as a safety device in addition to a main bearing. A joint (12) is formed between an outer ring (3) of the backup bearing (2) and a housing (4) surrounding same.

7 Claims, 3 Drawing Sheets

(56) References Cited

U.S. PATENT DOCUMENTS

| | | | | |
|---|---|---|---|---|
| 4,708,499 | A * | 11/1987 | Loser | F16C 23/084 384/484 |
| 5,205,384 | A * | 4/1993 | Heshmat | F16C 27/04 188/264 B |
| 5,468,074 | A * | 11/1995 | Godec | F16C 23/084 384/495 |
| 5,612,583 | A * | 3/1997 | Crucq | H02K 5/1732 310/273 |
| 6,379,048 | B1 * | 4/2002 | Brissette | F16C 27/063 384/202 |
| 6,524,005 | B2 * | 2/2003 | Bridges | F16C 19/163 310/90.5 |
| 6,948,857 | B2 * | 9/2005 | Schuetz | F16C 23/084 384/498 |
| 7,628,542 | B2 * | 12/2009 | Wada | F16F 15/0237 384/535 |
| 8,002,251 | B2 * | 8/2011 | Hindle | B64G 1/286 267/140.11 |
| 8,231,279 | B2 * | 7/2012 | Falsetti | F16C 35/077 384/498 |
| 9,388,852 | B2 * | 7/2016 | Bedenk | F16C 27/04 |
| 2004/0062462 | A1 * | 4/2004 | Jacquet | F16C 23/084 384/495 |
| 2014/0072254 | A1 * | 3/2014 | Pausch | F16C 32/0442 384/513 |
| 2014/0354098 | A1 * | 12/2014 | Krebs | F16C 32/0402 310/90.5 |

FOREIGN PATENT DOCUMENTS

| | | |
|---|---|---|
| DE | 102006028200 | 12/2007 |
| DE | 102006026123 | 1/2008 |
| DE | 102010032111 | 1/2012 |
| DE | 102010035183 | 3/2012 |
| DE | 102011005761 | 9/2012 |
| JP | 20111972 | 1/2011 |

* cited by examiner

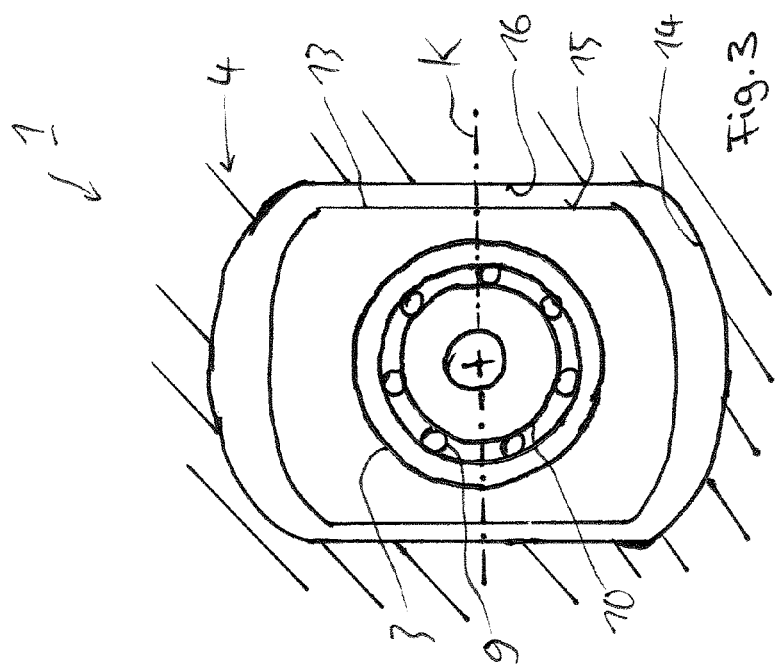
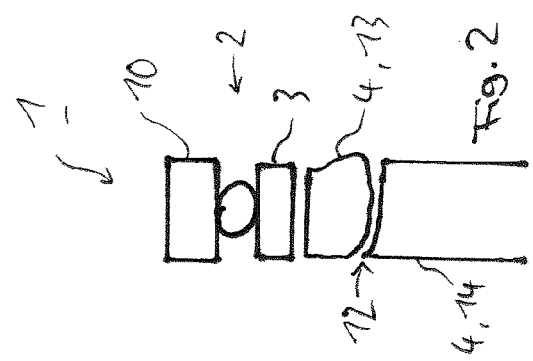
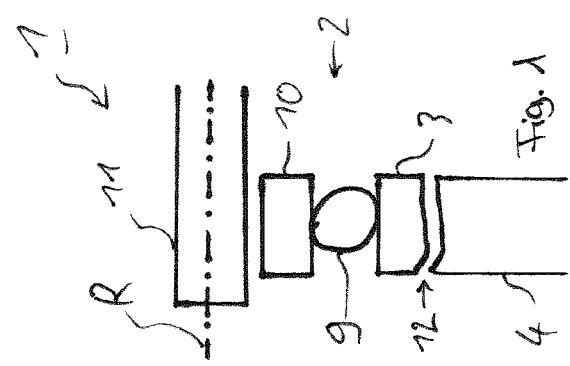

BEARING ARRANGEMENT COMPRISING A BACKUP BEARING

FIELD OF THE INVENTION

The invention relates to a bearing arrangement comprising a backup bearing. Such a backup bearing is provided to come into operation in the event of the failure of a main bearing formed, in particular, as a magnetic bearing, wherein a housing holding the backup bearing has a partially elastically pliant design for reducing force spikes.

BACKGROUND

A bearing arrangement according to the class with a backup bearing is known from DE 10 2011 005 761 A1. The backup bearing represents a safety device that allows, in the event of the failure of a magnetic bearing, the danger-free running down of a shaft supported by magnets in ordinary operation. For this purpose, a housing holding the backup bearing has a slot that extends essentially in the circumferential direction of an outer ring of the backup bearing and is formed as a through hole. The slot extends, for example, over a circumferential angle from 50° to 180° and has a width of less than 2 mm. If a magnetic bearing provided for supporting the shaft fails, the shaft is supported by the backup bearing, wherein the walls of the slot providing a spring path can form a block.

Another backup bearing for a magnetic bearing is known from DE 10 2010 035 183 A1. An outer ring of this backup bearing is surrounded by a damping ring that has recesses arranged at regular positions on its lateral surface. Such a backup bearing is provided, for example, for use in electrical machines or turbochargers.

DE 10 2010 032 111 A1 discloses a backup bearing for a contactless, supported rotor in which two outer ring parts are clamped elastically relative to each other in the axial direction. Both outer ring parts contact a centering ring that has the task of centering the outer ring parts in the radial direction with a positive fit connection to each other, in particular, when the outer ring parts are pressed away from each other in the axial direction due to a radial force acting on the backup bearing.

To damp a bearing ring, in addition to mechanical damping elements, hydraulic damping devices are also basically known. One example here is disclosed in patent DE 10 2006 026 123 B4 that relates to a method for damping movements of a rotor in the radial direction relative to the rotor axis. A ring gap running about the rotor axis is here filled with a viscous medium that is loaded as a function of the operating state of the rotor with different pressures.

SUMMARY

The invention is based on the object of providing a bearing arrangement comprising a backup bearing that is especially well adapted to the forces, which include forces due to weight and acceleration and are to be absorbed in the event of the failure of a main bearing, in particular, a magnetic bearing.

This objective is achieved by a bearing arrangement comprising a backup bearing with one or more features of the invention.

The bearing arrangement has a backup bearing that comes into operation in the event of the failure of a main bearing and is held by means of a joint, i.e., so that it can pivot at least slightly, in a surrounding construction that is called housing below without limiting its general purpose.

According to a first possible construction of the backup bearing, this has an outer ring that itself is part of the joint. Such a shape of an outer ring, but not in connection with a backup bearing, is known, in principle, for example, from DE 10 2006 028 200 A1 and from DE 27 47 427 A1.

According to another possible construction of the backup bearing, the joint is formed completely by components of the housing. In this case, a distinction is made between an area of the housing close to the bearing directly surrounding the outer ring and an area of the housing away from the bearing surrounding this area, wherein the area close to the bearing can be pivoted together with the outer ring of the backup bearing relative to the area away from the bearing.

Both the construction in which a component of the joint is formed directly by the outer ring and also the latter construction in which the joint is formed only by the housing, can be shaped such that the joint has a defined tilting axis, also called preferred tilting axis. The term preferred tilting axis means that a pivoting motion about this axis is easier relative to other pivoting motions. This also includes constructions in which the preferred tilting axis is the only tilting axis, while no other tilting motions about other axes are possible. The preferred tilting axis is, in an advantageous construction, oriented orthogonal to the rotational axis of the backup bearing. Both for a horizontal rotational axis and also for a vertical rotational axis, the preferred tilting axis can be oriented horizontally.

The construction with a joint integrated in the housing preferably has a slot that runs in the circumferential direction of the outer ring of the backup bearing and is formed as a through hole and has at least one non-cylindrical wall. Through this construction, both flexibility of the outer ring in a direction orthogonal to the rotational axis of the backup bearing and also an at least slight tilting capability of the outer ring within the housing is produced while applying a force, in particular, simultaneously applying radial forces and tilting forces.

The backup bearing is preferably formed as a radial bearing or is effective at least essentially as a radial bearing, wherein the radial stiffness is at the lowest, wherein radial stiffness is defined as the reciprocal of the radial flexibility, as a function of angle and here advantageously in the geodetically lowest area of the bearing arrangement, that is, in the area most loaded by the weight of a supported object.

In one possible embodiment, the backup bearing is suitable both for receiving radial forces and also for receiving axial forces. Advantageously, the backup bearing is a rolling bearing, for example, a two-row angular contact ball bearing or conical roller bearing. Likewise, sliding bearings or combination roller-sliding bearings are suitable as backup bearings within the bearing arrangement. As long as the backup bearing is formed as a rolling bearing, whose rolling bodies, in particular, balls, are advantageously arranged without a cage between the bearing rings.

The invention starts from the idea that for holding a shaft by means of a backup bearing, a significant displacement and/or bending of the shaft takes place. This displacement and/or bending has the result that the backup bearing preferably formed as a rolling bearing is loaded in a way that is not ideally adapted to the bearing construction. For example, tilting loads are possible for which the backup bearing is not designed. Very strong mechanical loads for load transfer through the backup bearing can occur, especially for so-called eddy forces. Eddy forces are here understood to be a state with an oscillating local center of gravity for the shaft.

In the special case of backwards eddy forces, bearing components circulate against the direction of rotation of the shaft in a surrounding part.

It has been shown that in the scope of the invention, multiple identical improvements of the bearing arrangement known from DE 10 2011 005 761 A1 can achieve the objective forming the basis of this invention. First, an embodiment can be realized in which the slot in the housing has at least one non-cylindrical wall.

According to a first variant of this embodiment, the arc-shaped slot in the axial top view has two walls that are parallel to each other. If the walls of the slot form a block due to deflection, an axial force is generated onto the backup bearing in a desired way. Even for non-uniform movements of a shaft that is often subject to eddy forces, regular axial forces are not produced, which contributes to the suppression of any resonance within the bearing arrangement and thus supports the disruption-free runout of the shaft. The axial forces that are applied to the outer ring and cause different displacements in the axial direction in different circumferential areas of the backup bearing, namely more pronounced in the area of the slot than in other, stiffer circumferential areas, also cause, in the desired way, a slight tilting of the outer ring of the backup bearing about an axis orthogonal to its rotational axis.

According to a second variant of this embodiment, the slot has a conical design. Here, the slot forms a block only on one of its end sides, while a gap remains between the walls of the slot on the other end side. In this state, additional deflection is not possible, but at least a slight tilting of the walls adjacent to the slot relative to each other is possible. The desired tilting is dimensioned in an advantageous construction to compensate for shaft bending caused by the shaft falling out from the magnetic bearing. In a preferred construction, the slot with conical cross section is wider on its wider end side by at least 10% than on its narrower end side.

Furthermore, the objective forming the basis of this invention can be solved in that the slot is arranged eccentric relative to a plane of symmetry of the outer ring normal to the rotational axis of the backup bearing.

Through this construction, as soon as the walls of the slot contact due to deflection of the bearing arrangement, that is, form a block, a tilting moment is generated between an inner section of the housing that faces the backup bearing and an outer section of the housing. In principle, comparable with the conical construction of the slot, the resulting, typically only minimally expressed tilting of the outer ring of the backup bearing is suitable for compensating for bending of the supported shaft.

Independent of whether the slot in the housing is symmetrical about the plane of symmetry of the outer ring of the backup bearing normal to the rotational axis of the backup bearing or is arranged eccentrically the slot can extend on its two end sides either across an identical angular area or across different angular areas. In the latter case, the slot is more open towards the side where the larger part of the weight to be received by the shaft occurs than on the opposite side which is turned away from an object to be supported and mainly exerting the weight. Through this construction, the at least minimal tilting of the backup bearing is supported when this takes over the function of the magnetic bearing provided as a main bearing.

The slot in the housing extends, for example, across an angle from 50° to 180°, in particular, 120°, and preferably has a minimum width of maximum 2 mm, for example, 0.25 mm. The extent of the slot measured in the axial direction of the outer ring is preferably less than half the width of the outer ring measured in the same direction.

In embodiments in which the slot is arranged centrally about the plane of symmetry of the outer ring, end-side walls of the housing that directly surround the slot and are normal to the rotational axis of the backup bearing can be offset toward the plane of symmetry of the backup bearing compared with the end sides of the housing farther away from the slot. In other embodiments, in particular, in an asymmetric arrangement of the slot, the housing can have, in its area having the slot and holding the outer ring of the backup bearing, a constantly flat end surface. In both cases, the tilting effect due to deflection can be not only emphasized such that the slot forms a block of adjacent walls, but also contact between such walls is already given such that due to a given asymmetry of the bearing and/or housing parts, there is both an angular dependency of the deflection behavior and also a flexibility of parts varying along the rotational axis. In particular, the latter property can be achieved in that a housing component directly supporting the outer ring has a thickness—measured in the radial direction—that varies in the axial direction of the outer ring and thus of the entire backup bearing.

In all of the embodiments, an advantage of the invention exists in that, through an asymmetry in the shape of a bearing arrangement having a backup bearing, in particular, through an asymmetry of a slot that produced elastic flexibility within a housing holding a backup bearing, desired forces are generated by the backup bearing while holding a shaft, wherein these forces reduce the load spikes acting on the backup bearing by enabling displacement in the radial direction and simultaneously limited tilting of an outer ring of the backup bearing. This supports the controlled runout of the shaft in the event of failure of the main bearing.

BRIEF DESCRIPTION OF THE DRAWINGS

Multiple embodiments of the invention are described below in more detail with reference to the accompanying drawings. Shown are, in each case with a schematic drawing:

FIG. 1 a first embodiment of a bearing arrangement with a backup bearing in cross section, FIG. 2 in a view analogous to FIG. 1, a second embodiment of a bearing arrangement with a backup bearing, FIG. 3 a bearing arrangement with a backup bearing in another sectional view, FIG. 4 in a cross section according to FIG. 1, another embodiment of a bearing arrangement with a backup bearing, FIG. 5 in a view analogous to FIG. 4, a modified embodiment of a bearing arrangement with a backup bearing, FIG. 6 in another view analogous to FIG. 4, a bearing arrangement with a backup bearing, FIG. 7 in a schematic view, the shape of a slot of a bearing arrangement with a backup bearing, wherein the slot has different widths on its two end sides.

DETAILED DESCRIPTION OF THE PREFERRED EMBODIMENTS

Figure 4:
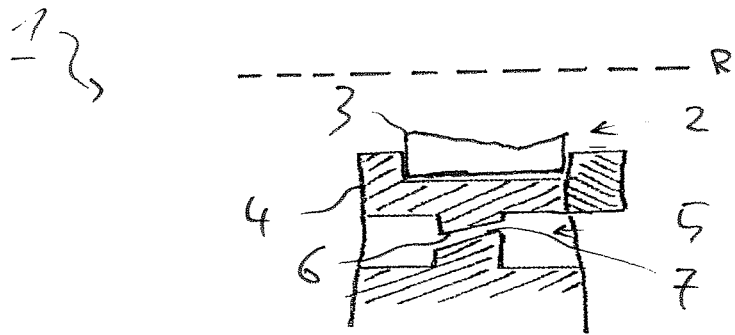

Parts that correspond to each other or that basically have the same function are marked with the same reference symbols in all of the figures.

A bearing arrangement marked overall with the reference symbol 1 comprises a backup bearing 2, of which, in FIG. 1, an outer ring 3, a rolling body 9, namely a ball, and an inner ring 10 are visible. The balls 9 roll without a cage between the bearing rings 3, 10. The inner ring 10 is spaced slightly away from a shaft 11 that is supported during proper operation of the bearing arrangement 1 by a not-shown main bearing, in particular, magnetic bearing. The backup bearing 2 comes into operation only in the event of the failure of the main bearing.

The outer circumference of the outer ring 3 has a spherical form that corresponds to a convex contour of a housing 4 holding the outer ring 3. Thus, between the outer ring 3 and the housing 4, a joint 12 is formed. As long as the backup bearing 2 is not in operation, the outer ring 3 is held by friction forces in the position shown in FIG. 1. If the main bearing fails and the shaft 11 is held by the backup bearing 2, this can cause angle errors within the bearing arrangement 1 that can be compensated by the joint 12 in the range of up to several degrees.

The arrangement according to FIG. 2 corresponds with respect to its function basically to the arrangement according to FIG. 1. In contrast to the bearing arrangement according to FIG. 1, however, for the bearing arrangement according to FIG. 2, a joint 12 is not formed between the backup bearing 2 and housing 4, but instead completely within the housing 4. The housing 4 here has two areas 13, 14 that can pivot relative to each other, namely an area 13 close to the bearing and an area 14 away from the bearing. The outer ring 3 is arranged in the area 13 close to the bearing, in particular, pressed into this area 13. The area 13 close to the bearing is formed essentially as a ring that is convex on its outer circumference—corresponding to the outer ring 3 according to FIG. 1. The area 14 farther away from the bearing and holding the ring-shaped area 13 close to the bearing has, analogous to the housing 4 according to FIG. 1, a concave inner surface that forms, in interaction with the convex outer surface of the area 13 close to the bearing, the joint 12 of the bearing arrangement 1.

FIG. 3 shows an improvement of the bearing arrangement 1 according to FIG. 2. In this improvement, the joint 12 has a defined tilting axis K that is arranged orthogonal to the rotational axis R (cf. FIG. 1) of the shaft 11. For a horizontal shaft 11, as given in the arrangements according to FIGS. 1 to 3, the tilting axis K is likewise arranged horizontally. The tilting axis K, in general also called preferred tilting axis, is realized in the bearing arrangement 1 according to FIG. 3 in that the area 13 close to the bearing and the area 14 away from the bearing in the housing 4 each have two side flattened sections 15, 16.

In the embodiment according to FIG. 4, the outer ring 3 is held in a housing 4 that has an arc-shaped slot 5 surrounding the outer circumference of the outer ring 3. With respect to the principle function of the bearing arrangement 1, refer to the prior art mentioned above, in particular, the Patent Application DE 10 2011 005 761 A1. The slot 5 extends across an angle from 50° to 180°, for example, across an angle of 120°, and has a gap width of less than 1 mm.

As emerges from the sectional view according to FIG. 4, the walls 6, 7 defining the slot 5 are not cylindrical, but instead conical. Here, in the embodiment according to FIG. 4, both walls 6, 7 are set at an equal angle relative to the rotational axis of the backup bearing 2 designed with R, so that the slot 5 has a constant width.

As soon as the backup bearing 2 comes into operation and holds a not-shown shaft that is otherwise supported magnetically, the housing 4 deflects in the area of the slot 5 in a desired way until the walls 6, 7 form a block. At this moment, an axial force is created between a section of the housing 4 facing the outer ring 3 and at the top in the arrangement according to FIG. 1 and a section of the housing facing away from the outer ring 3 and the entire backup bearing 2 and at the bottom in the arrangement according to FIG. 1. The deflection is accompanied by a tilting of the backup bearing 2, wherein this deflection corresponds to the shaft tilting. The walls 6, 7 form a block on one hand toward the area 13 close to the bearing and on the other hand toward the area away from the bearing 14, with the joint 12 being formed between these areas.

Figure 5:
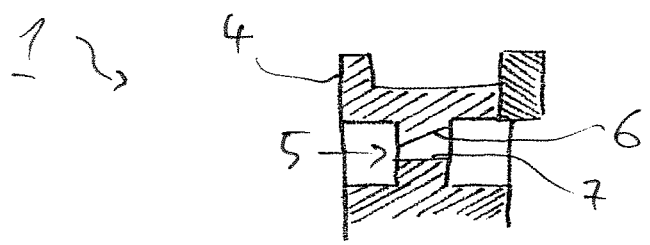

The embodiment according to FIG. 5 differs from the embodiment according to FIG. 4 in that only the inner wall 6 of the slot 5 facing the backup bearing 2 is conical, while the outer wall 7 of the slot 5 is cylindrical. The slot 5 therefore has overall a conical shape in the shown cross section. In contrast to the embodiment according to FIG. 4, in the embodiment according to FIG. 5, the walls 6, 7 do not form a block completely, but only on one side of the slot 5, in the arrangement according to FIG. 5, on the left. In this way, when the walls 6, 7 contact each other, a tilting moment is produced that tilts at least minimally the section of the housing 4 facing the backup bearing 2 relative to the outer section of the housing 4 facing away from the backup bearing 2. In the arrangement according to FIG. 5, a not-shown load that must be held by the backup bearing 2 is located mainly at the right of the bearing arrangement 1. The load is, for example, the rotor of an electric machine or a turbine. The load falling into the backup bearing 2 leads to a shaft bending that is partially or completely compensated or even slightly overcompensated by the minimal tilting of the backup bearing 2 caused with the help of the cross-sectional contour of the slot 5.

Figure 6:
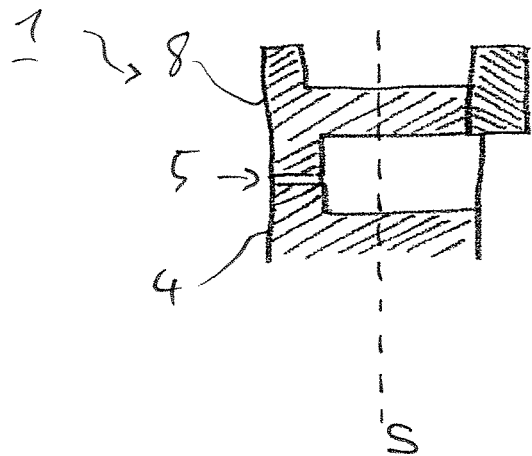

A targeted tilting of the backup bearing 2, as soon as this comes into operation, is also given for the embodiment according to FIG. 6. In contrast to the embodiments according to FIGS. 4 and 5, in the embodiment according to FIG. 6, the slot 5 is not arranged centrally relative to the outer ring 3, that is, uniformly about a plane of symmetry S of the outer ring 3 normal to the rotational axis R of the backup bearing 2, but instead eccentrically so that a completely flat end surface 8 of the housing 4 is formed in the areas in which the slot 5 is arranged and the outer ring 3 is held.

The entire slot 5 is located in the arrangement according to FIG. 6 outside of the mentioned plane of symmetry S of the backup bearing 2. Even more pronounced than in the embodiment according to FIG. 5, a closing of the slot 5 caused by loading leads to a tilting moment that acts on the backup bearing 2 and compensates for a bending of a supported shaft.

Figure 7:
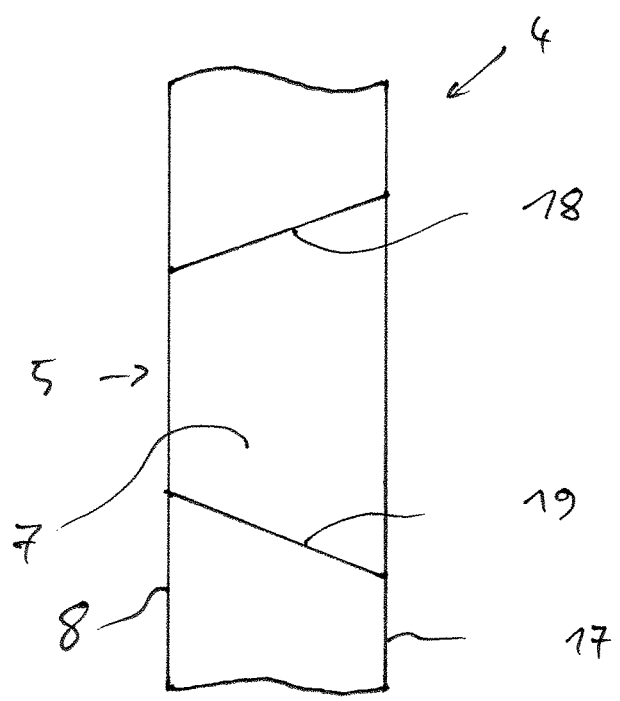

FIG. 7 shows, in a schematic detail, an improvement of the arrangement according to FIG. 6 that can be realized in an analogous way also in the arrangements according to FIGS. 4 and 5. Here, the slot 5 is visible in a view radially from the inside to the outside on the area 14 away from the bearing.

The slot 5 running in the circumferential direction of the backup bearing 2 is thus shown in the modified, two-dimensional shape. In the axial direction of the backup bearing 2, the slot 5 extends from the end face 8 up to a second end face 17. In the circumferential direction, the slot 5 is limited by two walls 18, 19 on the circumferential side, whose extent corresponds in the radial direction of the backup bearing 2 to the gap width of the slot 5. As emerges from FIG. 7, the width of the slot 5 on the first end face 8 is smaller than on the second end face 17. The slot 5 becomes wider in the axial direction. In this way it is achieved that the backup bearing 2 deflects more strongly on the second end face 17 in comparison with the first end face 8.

LIST OF REFERENCE NUMBERS

1 Bearing arrangement
2 Backup bearing
3 Outer ring
4 Housing
5 Slot
6 Wall
7 Wall
8 End face
9 Roller body
10 Inner ring
11 Shaft
12 Joint
13 Area close to bearing
14 Area away from bearing
15 Flattened section of the area close to the bearing
16 Flattened section of the area away from the bearing
17 End face
18 Wall
19 Wall
K Tilt axis
R Rotational axis
S Plane of symmetry

The invention claimed is:

1. A bearing arrangement comprising a backup bearing provided as a safety device and a main bearing, and a joint is formed between an outer ring of the backup bearing and a housing surrounding the backup bearing,
   wherein the joint is formed between a first area of the housing directly surrounding the outer ring and a second area of the housing spaced away from the bearing and surrounding the first area,
   wherein between the first area of the housing and the second area of the housing spaced away from the bearing, there is a slot that extends in a circumferential direction of the outer ring, and
   wherein walls of the slot are non-parallel such that the slot widens in an axial direction, and
   Wherein the slot is at least 10% wider on a wider end side than on a narrower end side thereof.

2. The bearing arrangement according to claim 1, wherein the joint has a tilt axis (K) orthogonal to a rotational axis (R) of the backup bearing.

3. The bearing arrangement according to claim 1, wherein the slot is formed such that a radial load acting on the outer ring is carried exclusively on a narrower end side.

4. The bearing arrangement according to claim 1, wherein the slot is arranged eccentric to a plane of symmetry (S) of the outer ring perpendicular to a rotational axis (R) of the backup bearing.

5. The bearing arrangement according to claim 4, wherein the slot is arranged completely outside of the plane of symmetry (S).

6. The bearing arrangement according to claim 5, wherein walls of the slot extend away from each other in the axial direction.

7. A bearing arrangement comprising a backup bearing provided as a safety device and a main bearing, and a joint is formed between an outer ring of the backup bearing and a housing surrounding the backup bearing,
   wherein the joint is formed between a first area of the housing directly surrounding the outer ring and a second area of the housing spaced away from the bearing and surrounding the first area,
   wherein between the first area of the housing and the second area of the housing spaced away from the bearing, there is a slot that extends in a circumferential direction of the outer ring, the slot including an open gap therebetween extending completely through the housing in the axial direction, and
   wherein the slot includes walls which are parallel to an axial direction of the bearing and which are arranged eccentric to a plane of symmetry (S) of the outer ring passing through a center of the housing and perpendicular to a rotational axis (R) of the backup bearing.

* * * * *